United States Patent [19]

Von Gruenberg et al.

[11] Patent Number: 4,867,280
[45] Date of Patent: Sep. 19, 1989

[54] HYDRAULICALLY ACTUATED WHEEL BRAKE

[75] Inventors: Hubertus Von Gruenberg, Kronberg; Karl Stoerzel, Dreieich, both of Fed. Rep. of Germany

[73] Assignee: Alfred Teves GmbH, Frankfurt am Main, Fed. Rep. of Germany

[21] Appl. No.: 632,816

[22] Filed: Jul. 20, 1984

[30] Foreign Application Priority Data

Jul. 26, 1983 [DE] Fed. Rep. of Germany ....... 3326823

[51] Int. Cl.[4] .................... F16D 55/18; F16D 65/32
[52] U.S. Cl. .................................. 188/72.4; 92/174; 188/72.5; 188/370
[58] Field of Search ............... 188/72.4, 72.5, 370, 188/361, 349, 264 CC; 92/174

[56] References Cited

U.S. PATENT DOCUMENTS

| | | | |
|---|---|---|---|
| 2,889,897 | 6/1959 | Sanford et al. | 188/264 D |
| 2,934,178 | 4/1960 | Eaton | 188/264 D |
| 2,992,705 | 7/1961 | Chisnell et al. | 188/72.4 X |
| 3,396,824 | 8/1968 | Meier | 188/72.5 |
| 3,526,171 | 9/1970 | Barnes | 92/98 |
| 3,554,334 | 1/1971 | Shimano et al. | 188/349 |
| 3,886,745 | 6/1975 | Kaida et al. | 188/72.5 X |

FOREIGN PATENT DOCUMENTS

| | | | |
|---|---|---|---|
| 252864 | 10/1962 | Australia | 188/361 |
| 3147933 | 6/1982 | Fed. Rep. of Germany . | |
| 47-50547 | 12/1972 | Japan | 188/72.4 |
| 1099402 | 1/1968 | United Kingdom | 188/370 |
| 1197749 | 7/1970 | United Kingdom | 188/72.4 |

*Primary Examiner*—George E. A. Halvosa
*Attorney, Agent, or Firm*—James B. Raden

[57] ABSTRACT

A brake system of the type having a disc-type wheel brake hydraulically operated by a master cylinder through connecting lines is disclosed. The system includes a member which divides the wheel brake into two chambers, one adjacent to the brake piston filled with a hydraulic fluid specifically formulated for meeting certain expected operating conditions in the wheel brakes. The second chamber is connected to the hydraulic lines and is filled with a second fluid specially formulated for meeting certain other different expected operating conditions in the lines and master cylinder.

2 Claims, 1 Drawing Sheet

HYDRAULICALLY ACTUATED WHEEL BRAKE

BACKGROUND OF THE INVENTION

The invention relates to hydraulically actuated wheel brakes in which the brake pressure is transmittable by pistons slidable within wheel brake cylinders to brake shoes furnished with friction linings, which brake shoes are pressable against relevant friction surfaces of the wheel, for example against brake discs or brake drums, for a conversion into heat of the energy of motion of the vehicle.

In the known wheel brake systems of this kind, the pistons which slide the brake shoes and are guided within the wheel brake cylinders, are directly connected with the pertaining power chambers in the master cylinder by means of a hydraulic fluid, the so-called brake fluid. As a consequence, the brake fluid must have properties which are essential with regard to the efficiency of the braking system under the varied conditions encountered in general automotive vehicle use. Such conditions include both the specific conditions prevailing at the location of the master cylinder and to those in the wheel brake cylinder, in the connecting lines and in any additional units, such as brake pressure modulators, which may be included in the system. Considering that the safety of a vehicle depends on the condition of the braking system and, therefore, also on the physical behaviour of the brake fluid, these prerequisites lead to severe requirements with regard to the reliability of the brake fluid, that is to say, with regard to the long-term stability of the required properties, even in adverse circumstances.

In view of the fluid requirements both in the master cylinder and in the brake with respect to long-term stability, characteristics of the fluid regarding boiling point, behaviour toward water, compressibility, corrosion resistance, agressiveness toward the rubber sealing elements, viscosity over the entire temperature range and the lubricating power of a hydraulic fluid suitable to serve as a brake fluid must be specified and controlled. Attempts to meet these requirements sometimes lead to contradictory results. For instance, solubility in water would be favorable since any penetrating water causing corrosion would be rendered harmless, if, however the boiling point were not reduced to inadmissibly low values due to the absorption of water. The hygroscopic behaviour of the customary brake fluids on the basis of glycol lead to the result that the brake fluids have to be changed at relatively short intervals. In this case due to the absorption of water, the boiling point decreases to such an extent that vapor locks occur in the liquid as an effect of the strong development of heat in the wheel brake, the vapor locks impairing the functioning of the brake to a dangerous degree due to the elevated compressibility of the vapor.

The boiling point of the currently used hygroscopic brake fluids is dependent on the water content and, therefore, is subject to aging. This feature gains more and more importance because cooling of the wheel brakes and of the brake fluid in the wheel brake is becoming more difficult for a number of reasons. For instance, the desire for aerodynamic vehicle bodies leads to designs which render it more difficult to convey cooling air supply to the wheel brakes. As compared with asbestos-containing brake linings, those made of materials free of asbestos, which are demanded increasingly have a considerably higher heat transmission which leads to increased heating of the brake fluid. These facts and still others have the result that elevated temperatures occur at least locally in some brake designs and may heat the brake fluid to the boiling point.

SUMMARY OF THE INVENTION

The invention has, therefore, for its object to overcome these inconveniences and to provide a wheel brake system for which higher temperatures of the brake fluid are permissible as compared to present wheel brakes while preventing the formation of vapor lock that jeopardizes the functioning of the brakes. The extra expenditure involved for the present system is considered to be moderate.

Indeed, it has become evident that this object can be achieved in a surprisingly simple, technologically advanced manner. The wheel brake system described herein separates the hydraulic fluid in the wheel brake cylinder or in the immediate vicinity of the wheel brake cylinder and acting on the brake pistons in a liquid-tight manner from the hydraulic fluid transmitting the brake pressure to the wheel brake.

Due to the present separation of the hydraulic fluids which can be achieved very simply be means of a diaphragm or an auxiliary piston it becomes possible to meet the different requirements which apply to the hydraulic fluid both in the wheel brakes and in the wheel brake cylinder and to that contained in the other units of the braking system, in particular in the master cylinder. In the wheel cylinder which is subject to a considerably higher thermal load than all other components, it is important that the fluid does not reach its boiling point. In many cases, this requirement can already by met by keeping the brake fluid clean and by keeping water away from the customary hygroscopic brake fluid. Regarding the lubricating power and the aggressiveness of hydraulic fluid contained in the wheel brake cylinder the requirements are, however, comparatively low since the piston travels but slight distances and since the components involved in that location can be made resistant to corrosive attack by the fluid as far as they are exposed to the fluid. As an alternative, a special liquid having a particularly high boiling point, but featuring comparatively poorer lubricating, corrosion, viscosity properties etc. could, therefore, be utilized as a hydraulic fluid. For the second hydraulic fluid which transmits the brake pressure from the master cylinder to the brake, a lower boiling point fluid may then be accepted in favor of the other properties already mentioned above.

The advantages of the present wheel brake system become manifest particularly in a spot-type fixed caliper disc brake, in which elevated temperatures may occur within the cover body arranged in the wheel rim and which are barely accessible to cooling air and in the bores transmitting the brake pressure from the flange side to the cover side.

BRIEF DESCRIPTION OF THE DRAWINGS

Further objectives and advantages of the invention are shown by the following description of further details, made with reference to the accompanying drawings in which.

DETAILED DESCRIPTION

Figure 1:
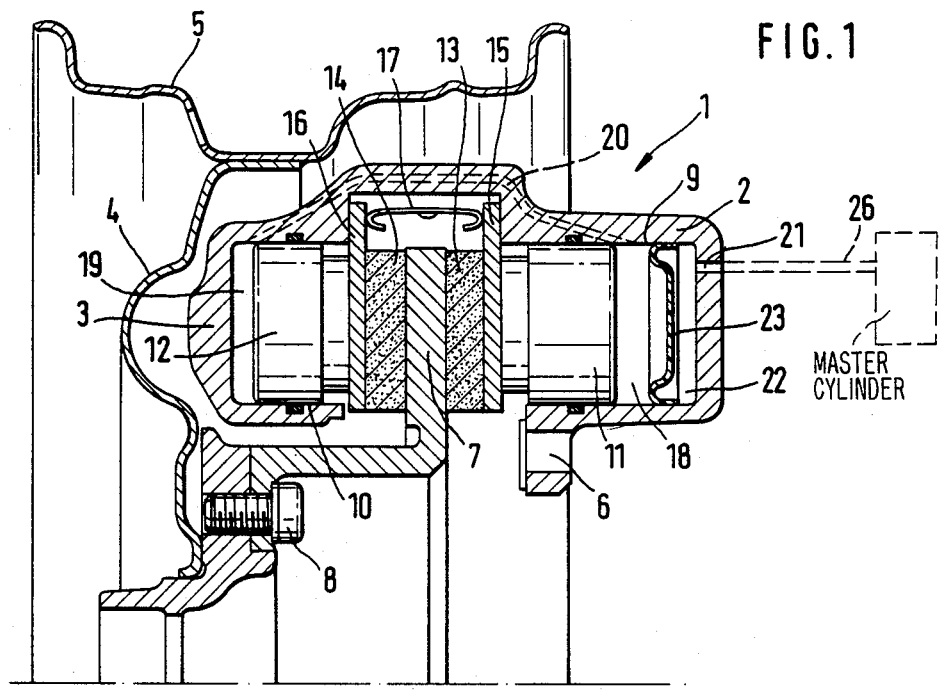
FIG. 1 is a cross-section through a plane running parallel to the vehicle axle and showing a version of a wheel brake with the pertaining brake disc and the wheel dish using the present invention.

The embodiment of the invention as shown in FIG. 1 has a spot-type fixed caliper disc brake being designated in its entirety by reference numeral 1. The disc brake has a flange body 2 mounted toward the inner side of the vehicle, and a cover body 3 arranged in a wheel dish 4 toward the outside relative to the vehicle. The part 5 of the wheel rim which accommodates the tire is also outlined.

The disc brake 1 is secured to the vehicle axle, e.g. to the wheel body with the aid of at least two mounting eyes 6 only one of which being shown in the drawings. This construction is generally known and therefore not shown in detail.

Again in a conventional manner, a brake disc 7 is secured to the wheel hub by means of screw bolts 8 so that the brake disc rotates synchronously with the rim 4 and 5 that is to say, with the wheel.

In a fixed caliper disc brake 1 of the type shown in the drawing, wheel brake cylinders 9 and 10 with the relevant pistons 11 and 12 are contained both in the flange body and in the cover body 2 and 3, respectively.

In the disc brake 1, there are shown brake shoes in axially slidable arrangement which are each composed of a friction lining 13 and 14 and a back plate or pad carrier 15 and 16.

During braking action, the friction linings 13 and 14 are pressed against the brake disc 7 from both sides by means of the pistons 11 and 12 so that the energy of motion of the wheel and, for that matter, of the vehicle is converted into heat due to friction concentrated adjacent the wheel rim.

An expansion spring 17 exerting the required restoring force on the brake shoes 13 and 14 through the brake carriers 15 and 16 takes care of a slight gap between the friction linings 13 and 14 on one side and the brake disc 7 on the other side upon termination of the braking action, i.e. upon the drop of the brake pressure.

On the back side of the pistons 11 and 12 and within the wheel brake cylinders 9 and 10, there are arranged power chambers 18 and 19 in which the brake pressure is built up hydraulically when braking action is initiated. The two power chambers 18 and 19 are interconnected by a duct 20 outlined by a dashed line in the drawing, which duct 20 extends through the interior of the disc brake 1. Therefore, there is always an identical pressure existing in both power chambers. The inlet port 21 is provided to connect the brake 1 with the master cylinder via a hydraulic feed line 26 outlined by a dashed line. The inlet port 21 ends in a further power chamber 22 within the wheel brake cylinder 9 positioned in the flange body 2 and, therefore, on the inner side of the disc brake 1 relative to the vehicle.

According to FIG. 1, the separation of the hydraulic fluids which constitutes the essential feature of the present invention is achieved with the aid of a diaphragm 23 which can be configured and fastened in a manner and by means similar to those of a diaphragm separating the fluids in hydraulic reservoirs according to known art. With the aid of that diaphragm 23, an unobstructed transmission of hydraulic pressure from the power chamber 22 to the power chambers 18 and 19 and a complete separation of the hydraulic fluids is attained in a very simple way. The heat generated by the friction between the brake disc 7 and the brake linings 13 and 14 during braking action leads to a strong heating of the hydraulic fluid and in particular of the fluid contained in the power chamber 19, which is shut off from the cooling air within the wheel dish 4, and in the connecting duct 20, especially when using linings 13 and 14 free of asbestos and thereby having an elevated heat conductivity. At particularly unfavorable points of heat dissipation within the chamber 19 and the duct 20, the boiling point may be exceeded locally. Where fluid temperature exceeds the boiling point, the dangerous formation of vapor locks may occur in the use of conventional brake fluids, especially when the boiling point has already decreased as a result of the absorption of water. The temperature of the hydraulic fluid in the inlet range of the disc brake, i.e. on the flange side precisely speaking is, lower and can be controlled more easily. Where necessary, it is easier to supply cooling air to the flange side than to the cover side and to the connecting ducts 20, which in some points come to be arranged very near to the source of heat. It will, therefore, suffice to ensure that the hydraulic fluid in the communicating spaces, i.e. in the chamber 18, in the duct 20 and in the power chamber 19, has a boiling point sufficiently high so as not to reach the boiling temperature in either brake.

The hydraulic fluid transmitting the brake pressure from the master cylinder (not shown) to the brake 1 may have a lower boiling point since it is exposed to the frictional heat, only indirectly.

For the quality and conditions of the hydraulic fluid in the inlet of and outside the wheel brake 1, the boiling point has, therefore, rather less importance than characteristics such as corrosion behaviour, the lubricating power, the viscosity at the encountered external temperatures. By separating the hydraulic fluids in accordance with the present invention, it is possible to adapt the properties of the hydraulic fluid to the dissimilar requirements in the braking system and to reduce the risk of excess heating and, consequently, of the formation of vapor lock in the event of an excess load of the brake.

Figure 2:
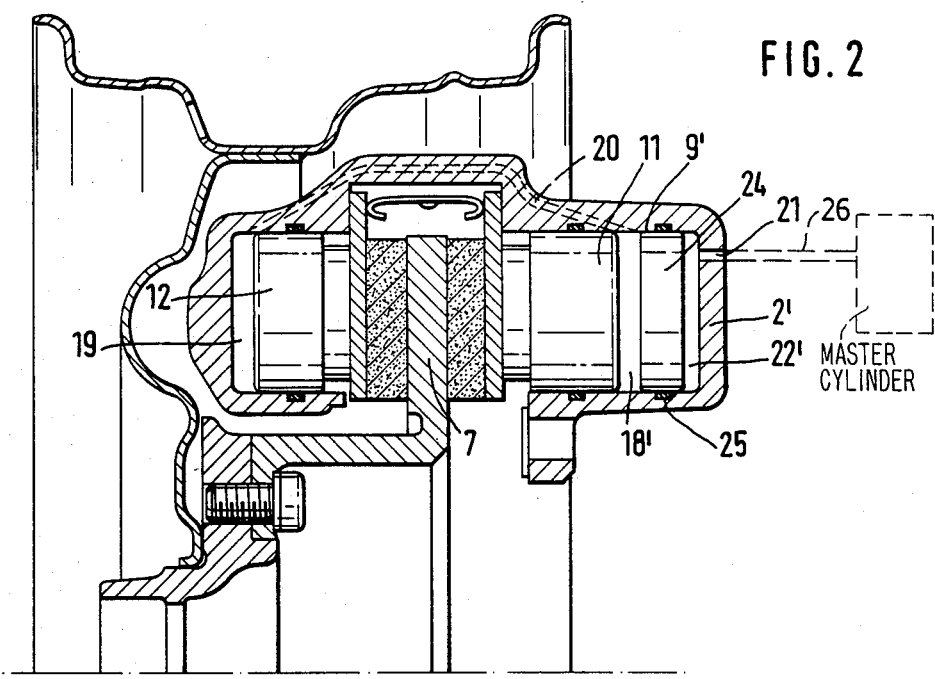
FIG. 2 shows a further version of the invention identical in principle to that of FIG. 1.

As a modification of the described fixed caliper disc brake 1, in the version as per FIG. 2 an auxiliary piston 24 is inserted in the wheel brake cylinder 9' in the flange side of the brake, the auxiliary piston 24 taking the place of a diaphragm. An annular seal 25 surrounding the auxiliary piston 24 prevents the penetration of hydraulic fluids from the power chamber 22' to the chamber 18' or vice versa. For the rest of their construction, the embodiments of the invention of FIG. 1 and FIG. 2 are identical so that identical reference numerals are used.

If, even though, in special cases the heat transfer through the wall of the flange body 2, 2' and/or through the diaphragm 23 or the piston 24 should be excessive, then the separation of the fluids can be performed externally, but in the immediate vicinity, of the wheel brake, according to still another embodiment of the invention (not shown). For that purpose, an auxiliary piston slidable in a cylinder similar to the right-hand part of the wheel brake cylinder 9' as per FIG. 2 may, for example, be used, or a hollow body subdivided into two power chambers by a diaphragm.

The separation of the hydraulic fluids according to the present invention can be applied to advantage in all those cases in which the diverse requirements within the wheel brake, in the other units and in the connecting lines either cannot at all or be met or can only be met by compromise accepting disadvantages (e.g. a frequent change of the fluid) of one single hydraulic fluid.

Openings for filling, draining, and venting of the spaces comprised of the two power chambers 18 and 19 and of the connecting ducts, the same as other design details are not shown in the illustrations so as to increase the clarity and ready understanding of the drawing.

What is claimed is:

1. A hydraulically operated disc brake system of the type including a master cylinder, a wheel brake, and a hydraulic line containing a hydraulic pressure fluid connecting said master cylinder to said wheel brake wherein said hydraulic fluid is subjected to at least one principle operational condition in said wheel brake and to at least one other principle operational condition in said hydraulic line and said master cylinder different from said one operational condition in said wheel brake comprising:

said wheel brakes including at least one wheel brake cylinder, at least one hydraulically operated piston in said cylinder, brake shoe means having friction linings actuated by said piston for frictionally engaging a rotating disc;

means for dividing said wheel brake cylinder into a first power chamber including said piston and a second power chamber in communication with said hydraulic line, said means for dividing said wheel brake cylinder adapted to transmit hydraulic pressure in said second power chamber to said first power chamber;

a first hydraulic fluid in said first power chamber having characteristics particularly adapted for meeting said one operational condition in said wheel brake; and a second hydraulic fluid in said master cylinder, said hydraulic line and said second power chamber particularly adapted for meeting said other different operational condition;

said second power chamber has a volume substantially less than said first power chamber.

2. A hydraulically operated disc brake system of the type including a master cylinder, a wheel brake, and a hydraulic line containing a hydraulic pressure fluid connecting said master cylinder to said wheel brake wherein said hydraulic fluid is subjected to at least one principle operational condition in said wheel brake and to at least one other principle operational condition in said hydraulic line and said master cylinder different from said one operational condition in said wheel brake comprising:

said wheel brakes including at least one wheel brake cylinder, at least one hydraulically operated piston in said cylinder, brake shoe means having friction linings actuated by said piston for frictionally engaging a rotating disc;

means for dividing said wheel brake cylinder into a first power chamber including said piston and a second power chamber in communication with said hydraulic line, said means for dividing said wheel brake cylinder adapted to transmit hydraulic pressure in said second power chamber to said first power chamber;

a first hydraulic fluid in said first power chamber having characteristics particularly adapted for meeting said one operational condition in said wheel brake, said first hydraulic fluid being of a type having silicone as a primary constituent and a boiling point exceeding an expected maximum operational temperature level in said wheel brake; and a second hydraulic fluid in said master cylinder of a type having glycol as a primary constituent, said hydraulic line and said second power chamber particularly adapted for meeting said different operational condition.

* * * * *